Patented July 20, 1937

2,087,549

UNITED STATES PATENT OFFICE 2,087,549

PREPARATION OF CELLULOSE ETHERS

Donald H. Powers, Moorestown, N. J., and Louis H. Bock, and Alva L. Houk, Bristol, Pa., assignors to Röhm & Haas Company, Philadelphia, Pa.

No Drawing. Application October 26, 1934, Serial No. 750,128

21 Claims. (Cl. 260—152)

This invention relates to a new method for preparing alkyl, aralkyl or hydroxy alkyl ethers of cellulose. Numerous processes have been proposed for the preparation of cellulose ethers, but in all these processes the etherification is carried out in the presence of sodium hydroxide or some other metallic hydroxide or oxide, and usually the cellulose or cellulose derivative used as the starting material is insoluble in the solvent in which the etherification is carried out. Furthermore, in these processes it is not possible to produce cellulose solutions without first causing the disintegration of the cellulose.

The present invention relates to a method for preparing the ethers from undegraded or undisintegrated cellulose. In our Patent 2,009,015 granted July 23, 1935, we have shown that undegraded cellulose may be dissolved in aqueous solutions of quaternary ammonium bases. If such solutions are treated with an etherifying agent, the corresponding ethers of cellulose are readily formed. The quaternary ammonium hydroxide serves the double purpose of a solvent for the cellulose and an alkaline condensing agent to bring about the reaction between the cellulose and the etherifying agent.

Among the quaternary ammonium hydroxides which may be used as solvent and condensing agent for the preparation of cellulose ethers, are the following: Trimethylethylammonium hydroxide, trimethylpropylammonium hydroxide, trimethylbutylammonium hydroxide, trimethylamylammonium hydroxide, trimethylhexylammonium hydroxide, trimethylbenzylammonium hydroxide, trimethylallylammonium hydroxide, trimethyl-isobutenylammonium hydroxide, dimethyldiethylammonium hydroxide, dimethyldibenzylammonium hydroxide, triethylmethylammonium hydroxide, tetraethylammonium hydroxide, trimethyl-p-chlorobenzylammonium hydroxide and triethylbenzylammonium hydroxide. In general, any quaternary ammonium hydroxide may be used which contains one or more alkyl or alkylene groups having two or more carbon atoms, or one or more aralkyl groups.

In order to carry out the etherification of cellulose according to our invention, it is not necessary that the cellulose be completely dissolved as the above mentioned quaternary ammonium hydroxides may be used under such conditions that no solution or only a part solution occurs, in which case they serve as basic condensing agents in place of the usual alkali hydroxides. However, all of the above quaternary ammonium hydroxides are capable of dissolving undisintegrated cellulose and it is usually advantageous to dissolve the cellulose completely before reacting on it with the etherifying agents.

It is well known that cellulose products made from undisintegrated cellulose are stronger and more resistant generally than similar products made from disintegrated cellulose. The same is true of the ethers made according to the present process and for this reason we prefer to use substantially pure alpha cellulose in the form of cotton, cotton linters, sulphite wood pulp or some form of regenerated cellulose, such as viscose rayon, cuprammonium rayon or hydrolyzed esters of cellulose. The process however, is also applicable to degenerated or disintegrated cellulose because these are more readily soluble in the quaternary ammonium hydroxides. However, one of the advantages of the present process is that undisintegrated cellulose may be used, thus yielding a superior product.

Any of the usual etherifying agents may be used in our process. In the following examples only a few are mentioned, but it is understood that in general any alkyl, alkylene, aralkyl or hydroxy alkyl ester of an inorganic acid may be used. Ethylene oxides may also be used as hydroxyalkylating agents. Among these etherifying agents are dialkyl sulphates such as dimethyl sulphate, diethyl sulphate, etc., methyl chloride and ethyl chloride, benzyl chloride, etc. Bromides and iodides such as ethyl bromide or methyl iodide can be used as readily as the chlorides listed. If a hydroxy alkyl ether is desired, ethylene chlorhydrine may be used as well as the ethylene oxide mentioned above.

The process may be illustrated by the following examples but is not limited to the exact conditions or materials shown, since the invention may be otherwise practiced within the scope of the appended claims.

1. A solution of cellulose is prepared by mixing 150 grams of bleached sulfite wood pulp with 600 grams of a 35% solution of trimethylbenzylammonium hydroxide in a steel dough mixer equipped with a steam jacket. After mixing for one hour at room temperature, the doughy mass is warmed to 55° C. by running steam into the outer jacket of the mixer and 1750 cc. of 4% aqueous sodium hydroxide is slowly added. The resulting solution is a syrupy liquid.

To 450 grams of cellulose solution prepared as above, is added slowly with constant agitation, 30 grams of dimethyl sulphate. Some heat is evolved by the reaction and the mass is allowed to warm up to 40° C. but no external heat is applied. After about two hours, the temperature falls to room temperature and stirring is continued for 18 hours. The reaction mass is poured into an equal volume of water in which it is almost completely soluble. The methyl cellulose may be isolated by neutralizing with acetic acid and adding one to two volumes of ethyl alcohol. The gelatinous precipitate is filtered and washed with alcohol. When dry it is a resinous solid soluble in water, but only slightly soluble in alcohol or acetone and insoluble in benzene or chloroform. In water it forms a viscous solution and may be used as a thickening agent. Analysis by Zeisel method (J. Chem. Soc. 81,318 and 115,193):

0.2787 gram of material gave 0.2860 gram of AgI. Percent $CH_3O=13.55$. This corresponds to 0.72 methoxyl groups to one $C_6H_{10}O_5$ unit.

2. A solution of cellulose is prepared by mixing 150 grams of bleached sulfite wood pulp with 600 grams of a 35% solution of trimethylbenzylammonium hydroxide in a steel dough mixer. After stirring cold for one hour, steam is turned into the jacket and the mass is warmed to 50° for thirty minutes. Fourteen hundred cubic centimeters of 8% trimethylbenzylammonium hydroxide solution is then added and mixing is continued until the solution is substantially clear.

To 415 grams of the above solution is added slowly with constant agitation 20 grams of dimethyl sulphate and stirring is continued without the application of external heat for three hours. The mass is allowed to stand 18 hours and then poured into 350 cc. of water. It is neutralized with dilute sulphuric acid whereupon a gelatinous precipitate forms. When filtered and dried it is a resinous solid which is insoluble in water, but dissolves readily in 4% sodium hydroxide solution to form a viscous solution. The methyl cellulose may be precipitated from the alkaline solution by running into dilute acids. Thus, films and filaments can be prepared.

*Analysis by Zeisel method*

0.2691 gram of material gave 0.1283 gram of AgI. Percent $CH_3O=6.2$. This corresponds to 0.32 methoxyl groups to one $C_6H_{10}O_5$ unit.

3. To 450 grams of cellulose solution as prepared in Example #1, is added slowly with constant agitation 51 grams of ethyl bromide. Some heat is evolved by the reaction. Stirring is continued for three hours and the mass is allowed to stand 18 hours. It is then poured into an equal volume of water and neutralized with dilute acetic acid. The free ethyl cellulose is precipitated by the addition of an equal volume of acetone. When dry it is a resinous mass which dissolves in water to form a viscous solution. On drying this solution, a tough film is obtained which is soluble in water.

*Analysis by Zeisel method*

0.2988 gram of material gave 0.1372 gram of AgI. Percent $C_2H_5O=8.8$. This corresponds to 0.33 ethoxyl groups to one $C_6H_{10}O_5$ unit.

4. A solution of cellulose is prepared by mixing 150 grams of bleached sulfite wood pulp with one liter of a 35% solution of trimethylbenzylammonium hydroxide in a steel dough mixer. After mixing one hour, 150 grams of diethyl sulphate is slowly added with constant agitation over a period of one hour. The temperature rises slightly but no external heat is applied. After stirring for two hours, 1500 cc. of water is added and mixed in to form a clear viscous solution. The solution may be neutralized with acetic acid without precipitating any of the ethyl cellulose. The solution as prepared is a good thickening agent. It may be dried into tough films. By precipitating with alcohol a dry resinous solid is obtained.

*Analysis by Zeisel method*

0.2787 gram of material gave 0.2189 gram of AgI. Percent $C_2H_5O=15.05$. This corresponds to .6 ethoxyl groups to one $C_6H_{10}O_5$ unit.

5. To 540 grams of ethyl cellulose solution prepared as in Example #4 is added with constant agitation 100 grams of 10% aqueous sodium hydroxide solution followed by 25 grams of benzyl chloride. The mixture is heated to 60° and stirred for three hours. At the end of this time a fine precipitate has formed which is filtered and washed with dilute acetic acid and then with water. The product is an ethyl benzyl cellulose insoluble in water and dilute alkali solutions, but soluble in 75% acetic acid to form a smooth viscous solution. The acetic acid solution may be dried to produce very tough and transparent films.

6. A mixture of 32 grams of bleached sulphite wood pulp and 250 cc. of a 20% solution of trimethylethylammonium hydroxide is stirred at 60° until homogeneous. Then 62 grams of diethyl sulfate is slowly added with stirring and stirring is continued for 5 hours, keeping the temperature at 40–50° C. A clear syrupy solution is obtained from which nothing precipitates when neutralized with acetic acid. The ethyl cellulose may be isolated by adding two volumes of acetone.

*Analysis by Zeisel method*

0.4036 gram of material gave 0.2812 gram of AgI. Percent $C_2H_5O=13.3$. This corresponds to .52 ethoxyl groups to one $C_6H_{10}O_5$ unit.

7. A mixture of 32 grams of bleached sulfite wood pulp and 250 cc. of a 40% solution of triethylbenzylammonium hydroxide is stirred till homogeneous and 50 grams of dimethysulphate is slowly added with continued stirring. The mass tends to gelatinize at first, but stirring is continued and the mass is heated to 90° for 4 hours and allowed to stand 18 hours. Water is then added and most of the material dissolves to form a viscous solution. By precipitating with two volumes of alcohol a solid product is obtained which is insoluble in water but soluble in 4% sodium hydroxide solution and in 75% acetic acid solution.

*Analysis by Zeisel method*

0.3890 gram of material gave 0.3323 gram of AgI. Percent $CH_3O=11.28$. This corresponds to 0.6 methoxyl groups to one $C_6H_{10}O_5$ unit.

8. A mixture of 32 grams of bleached sulphite wood pulp and 200 cc. of a 40% solution of triethylbenzylammonium hydroxide is stirred till homogeneous and 37.8 grams of benzyl chloride is slowly added with continued stirring. As the reaction proceeds, heat is evolved and the viscosity becomes less. Stirring is continued for 6 hours at 80°. The fine precipitate of benzyl cellulose is filtered and washed with water.

9. Four hundred thirty-five grams of a cellulose solution prepared as in Example #1 is placed in a one liter flask equipped with an efficient stirrer and a tube which dips below the surface of the liquid. Through this tube is introduced 10 grams of ethylene oxide gas with constant agitation. Some heat is evolved by the reaction, but no external heat is applied. After all the ethylene oxide has been added, stirring is continued for 1½ hours. The mixture is then poured into dilute acetic acid. Most of the material remains in solution. It may be isolated by adding an equal volume of acetone. The product is insoluble in water, but soluble in 4% sodium hydroxide solution.

10. A hydroxyethyl cellulose soluble in water may be prepared as described in Example #9 if 30 grams of ethylene oxide is used instead of 10 grams.

11. A cellulose solution is prepared by mixing 162 grams of bleached sulfite wood pulp with 800 cc. of a 35% solution of trimethylbenzylammonium hydroxide in a steel dough mixer. As soon as the mixture is homogeneous 400 cc. of diethyl sulphate is added slowly over a period of three hours. The mixture is poured into alcohol, neutralized with dilute acetic acid and an equal volume of water is added. The gelatinous precipitate which forms is filtered and dried. The product is only very slightly soluble in water and is insoluble in 4% sodium hydroxide solution. It dissolves in alcohol.

*Analysis by Zeisel method*

0.3902 gram of material gave 0.6265 gram of AgI. Percent ethoxyl =30.7. This corresponds to 1.25 ethoxyl groups to one $C_6H_{10}O_5$ unit.

12. Thirty-two grams of bleached sulphite wood pulp is dissolved in 240 grams of a 35% solution of trimethylbenzylammonium hydroxide. When the solution is homogeneous, 36 grams of 2-methylallyl chloride is slowly added keeping the temperature at 60°. Stirring is continued six hours. The ether precipitates from solution as it forms. It is filtered and washed with water. When dry it is insoluble in water and dilute sodium hydroxide, but dissolves in 75% acetic acid to form a viscous syrup.

The properties of cellulose films or filaments may be modified by adding to the cellulose dissolved in a quaternary ammonium hydroxide solution, cellulose ethers which are themselves soluble in the quaternary ammonium hydroxide solution. Thus, a cellulose solution such as that prepared in Example No. 1 may be mixed with varying proportions of the methyl cellulose prepared in Example No. 2. The methyl cellulose may be added in the form of the reaction mixture in which it is prepared or the pure isolated ether may be added. Thus, it is possible to obtain films or filaments containing a mixture of cellulose and cellulose ether and the properties of the films and filaments can be largely modified by varying the proportions of cellulose and cellulose ether used.

It should be noted that undegraded cellulose cannot be dissolved in appreciable quantities in sodium hydroxide. On the other hand, a solution of cellulose in a quaternary ammonium hydroxide may be diluted with sodium hydroxide without precipitation. It has been found that when undisintegrated cellulose is treated with a mixture of quaternary ammonium hydroxide and sodium hydroxide that no solution occurs. It has also been found that when cellulose is treated with and contains sodium hydroxide it will not dissolve in quaternary ammonium hydroxide. It is clear then that the type of solution obtained when aqueous sodium hydroxide is added to solutions of cellulose in a quaternary ammonium hydroxide is entirely different and distinct from those compositions obtained by treating cellulose with sodium hydroxide alone. It has further been found that undisintegrated cellulose dissolved in a quaternary ammonium hydroxide and diluted with sodium hydroxide reacts with alkylating agents in the same way as cellulose dissolved in aqueous solutions of quaternary ammonium hydroxides alone.

We claim:—

1. The process of producing cellulose ethers comprising treating cellulose with an etherifying agent in the presence of an aqueous solution of a quaternary ammonium hydroxide.

2. The process of producing cellulose ethers comprising treating alpha cellulose with an etherifying agent in the presence of an aqueous solution of a quaternary ammonium hydroxide.

3. The process of producing cellulose ethers comprising dissolving alpha cellulose in an aqueous solution of a quaternary ammonium hydroxide and treating the dissolved cellulose with an etherifying agent, said ammonium hydroxide having the formula $(R)_3R'NOH$ in which each R is a methyl or ethyl group and R' is a saturated or unsaturated alkyl radical containing more than one and less than seven carbon atoms or an aralkyl radical.

4. The process of producing cellulose ethers comprising dissolving cellulose in an aqueous solution of a quaternary ammonium hydroxide and treating the dissolved cellulose with an etherifying agent, said ammonium hydroxide having the formula $(R)_2(R')_2NOH$ in which each R is a methyl or ethyl group and each R' is a saturated or unsaturated alkyl radical containing more than one and less than seven carbon atoms or an aralkyl radical.

5. The process of producing cellulose ethers comprising dissolving cellulose in an aqueous solution of a quaternary ammonium hydroxide and treating the dissolved cellulose with an etherifying agent, said ammonium hydroxide containing three methyl groups and an aralkyl radical.

6. The process of producing cellulose ethers comprising dissolving cellulose in an aqueous solution of trimethyl benzyl ammonium hydroxide and treating the dissolved cellulose with an etherifying agent.

7. The process of producing cellulose ethers comprising dissolving cellulose in an aqueous solution of a quaternary ammonium hydroxide and treating the dissolved cellulose with an etherifying agent, said ammonium hydroxide containing three methyl groups and an unsaturated aliphatic radical.

8. The process of producing cellulose ethers comprising dissolving cellulose in an aqueous solution of trimethyl isobutenyl ammonium hydroxide and treating the dissolved cellulose with an etherifying agent.

9. The process of producing cellulose ethers comprising dissolving cellulose in an aqueous solution of a quaternary ammonium hydroxide and treating the dissolved cellulose with an etherifying agent, said ammonium hydroxide containing two alkyl radicals and two aralkyl radicals.

10. The process of producing cellulose ethers comprising dissolving cellulose in an aqueous solution of dimethyldibenzyl ammonium hydroxide and treating the dissolved cellulose with an etherifying agent.

11. The process of producing cellulose ethers comprising treating alpha cellulose with an etherifying agent in the presence of an aqueous solution of a quaternary ammonium hydroxide having the formula $(R)_2(R')_2NOH$ in which each R is a methyl or ethyl group and each R' is a saturated or unsaturated alkyl radical containing more than one and less than seven carbon atoms or an aralkyl radical.

12. The process of producing cellulose ethers comprising treating alpha cellulose with an etherifying agent in the presence of an aqueous solution of a quaternary ammonium hydroxide containing three methyl groups and an aralkyl radical.

13. The process of producing cellulose ethers comprising treating alpha cellulose with an etherifying agent in the presence of an aqueous solution of a quaternary ammonium hydroxide containing two alkyl radicals and two aralkyl radicals.

14. The process of producing cellulose ethers comprising treating cellulose in the presence of an aqueous solution of a quaternary ammonium hydroxide with an etherifying agent that is an ester of an inorganic acid, the alcohol radical of which has the general formula $R\,CH_2$—in which R represents hydrogen or an organic radical.

15. The process of producing cellulose ethers which comprises treating cellulose in the presence of an aqueous solution of a quaternary ammonium hydroxide with an etherifying agent that is an aliphatic ester of an inorganic acid.

16. The process of producing cellulose ethers comprising treating alpha cellulose in the presence of an aqueous solution of a quaternary ammonium hydroxide with an etherifying agent that is an ester of an inorganic acid, the alcohol radical of which has the general formula $R\,CH_2$—in which R represents hydrogen or an organic radical.

17. The process of producing cellulose ethers comprising treating alpha cellulose in the presence of an aqueous solution of a quaternary ammonium hydroxide with an etherifying agent that is an ester of an inorganic acid, the alcohol radical of which has the general formula $R\,CH_2$—in which R represents hydrogen or an organic radical, said quaternary ammonium hydroxide containing at least one benzyl substituent.

18. The process of producing cellulose ethers which comprises treating cellulose with an etherifying agent in the presence of an aqueous solution of a quaternary ammonium hydroxide having the formula $(R)_3R'NOH$ in which R is a methyl or ethyl group and R' is an aralkyl radical or a saturated or unsaturated alkyl radical containing more than one and less than seven carbon atoms.

19. The process of producing cellulose ethers which comprises treating cellulose in the presence of an aqueous solution of a quaternary ammonium hydroxide with an etherifying agent that is an ester of an inorganic acid, the alcohol radical of which has the general formula $R\,CH_2$—in which R represents hydrogen or an organic radical, said quaternary ammonium hydroxide containing at least one benzyl substituent.

20. The process of producing cellulose ethers comprising treating cellulose with an etherifying agent in the presence of an aqueous solution of a quaternary ammonium hydroxide which contains as one of its substituents a member of the group consisting of aliphatic groups having at least two carbon atoms and aralkyl groups.

21. The process of producing cellulose ethers comprising treating alpha cellulose with an etherifying agent in the presence of an aqueous solution of a quaternary ammonium hydroxide which contains as one of its substituents a member of the group consisting of aliphatic groups having at least two carbon atoms and aralkyl groups.

DONALD H. POWERS.
LOUIS H. BOCK.
ALVA L. HOUK.